United States Patent Office 3,532,522
Patented Oct. 6, 1970

3,532,522
METHOD OF PRODUCING CERAMIC COMPOSITIONS WITH IMPROVED GREEN STRENGTH
John R. Richards, Surbiton, Surrey, England, assignor to United States Borax & Chemical Corporation, Los Angeles, Calif.
No Drawing. Filed Oct. 19, 1966, Ser. No. 587,651
Claims priority, application Great Britain, Nov. 1, 1965, 46,149/65
Int. Cl. C04b 33/00
U.S. Cl. 106—45                1 Claim

ABSTRACT OF THE DISCLOSURE

Method of producing ceramic compositions containing clay, flint, and a flux, in which an alkaline earth metal containing borate, such as calcium borate, is employed as the flux. By use of an alkaline earth metal borate an improved green strength of the unfired bodies is obtained and lower firing temperatures are required.

---

This invention relates to ceramic compositions of the type comprising (a) clay, (b) flint, and (c) a flux, which flux normally is stone, feldspar or nepheline syenite. From a ceramic composition of this type are made, by firing the composition, the shaped bodies known as "white-ware," such as porcelain, pottery, earthenware, and the like.

In ceramic compositions of the type hereinbefore defined, the clay is normally a mixture of ball clay and china clay, the flint may be a finely powdered silica, generally calcined, and the flux, a typical example of which is Cornish Stone, is included in the composition to make it possible to fire the composition successfully at a lower temperature.

A description of certain compositions of the type hereinbefore defined is to be found in the "Encyclopedia of Chemical Technology" (Kirk-Othmer), volume III (1954), p. 545, published by the Interscience Encyclopedia, in an article entitled "Ceramic Industries (White-Ware)."

We have now discovered that in a ceramic composition of the type hereinbefore defined the flux can consist of a metal borate other than an alkali metal borate, in particular, a metal borate containing an alkaline earth metal.

The present invention thus includes a ceramic composition of the type set forth in which the flux consists of an alkaline earth metal borate, for example calcium borate ($2CaO \cdot 3B_2O_3$) or the mineral colemanite. The resultant compositions have a much better green strength and the temperature of firing required to give a greater strength to the fired body is lower when calcium borate is used than when stone is used.

In general, when the borate used in this invention replaces stone, it is found that a smaller proportion of the borate than of stone is needed. For example, a composition may require 15 parts of stone to give a desired result in the fired body, while the corresponding composition including a borate would require only 10 parts of the said borate.

Ceramic compositions of the type to which this specification relates can be shaped, after appropriate treatment, to provide "green" bodies, which can then be fired to provide rigid ceramic bodies. The present invention thus includes rigid ceramic bodies formed by firing a ceramic composition containing an alkaline earth metal borate.

The following ranges of proportions, in which parts are by weight, are indicative of ceramic compositions according to the invention in which the flux is a borate; 30–70 parts of clay such as ball clay and china clay, 20–50 parts of flint, and a quantity of a calcium-containing borate sufficient to provide 3–15, preferably 8–13, parts of the borate calculated as $2CaO \cdot 3B_2O_3$.

While calcium borate is the preferred source of the boric oxide, similar minerals such as calcium magnesium borate and other borates of the metals of Group II of the Periodic Table may also be used.

The invention will now be further described in the following examples.

EXAMPLE I

The following formulation:

| | Parts |
|---|---|
| Vitblend 343 ball clay | 5 |
| B.W.S. ball clay | 5 |
| E.W.V.A. ball clay | 5 |
| E.O.B.C. ball clay | 5 |
| Fayles blue ball clay | 5 |
| Parts ball clay | 25 |
| S.C. China clay | 12½ |
| C.C. China clay | 12½ |
| Parts China clay | 25 |
| Flint | 35 | was weighed out and blunged for a total time of 12 hours, and was then allowed to stand overnight. The slip was then passed through a 120's sieve to remove the large particles of lignite and other extraneous material, dried on plaster bats to a plastic consistency and then to dryness in an oven at 110° C. The resulting material was mixed with 5 parts of calcium borate to give a body marked "CD-5," and the body was blunged for about 5 hours with water, sieved through a 120 mesh sieve, dried to a plastic condition on plaster bats, and extruded through a de-airing pug mill into ½ and ¾ inch diameter rods. The ½ inch diameter rods were subsequently cut into lengths of approximately 6 inches and the ¾ inch rods into lengths of approximately 1 inch from which ovoids were rolled by hand.

Ten rods and four ovoids, after being dried in an oven at 110° C., were placed in a kiln and fired by increasing the temperature by 50° per hour until the peak temperature indicated in Table II was obtained and maintaining this temperature for two hours.

EXAMPLE II

Example I was repeated except that, instead of 5 parts of calcium borate, 10 parts were used, to give bodies identified as "CD-10."

EXAMPLE III

Example I was repeated except that, instead of 5 parts of calcium borate, 15 parts were used, to give bodies identified as "CD-15."

EXAMPLE IV

Example I was repeated except that, instead of 5 parts of calcium borate, 7 parts were used, to give bodies identified as "CD-7."

EXAMPLE V

Example I was repeated except that, instead of 5 parts of calcium borate, 8 parts were used, to give bodies identified as "CD-8."

EXAMPLE VI

Example I was repeated except that, instead of 5 parts of calcium borate, 9 parts were used, to give bodies identified as "CD-9."

EXAMPLE VII

Example I was repeated except that, instead of 5 parts of calicum borate, 10 parts of nepheline syenite, a well known flux, were used to give bodies identified as "NS-10."

EXAMPLE VIII

Example I was repeated except that, instead of 5 parts of calcium borate, 15 parts of comminuted stone were used, to give a ceramic body coded as "SE."

TEST RESULTS

Measurements were made on the "green" and fired bodies of Examples I–VIII as follows:

(1) "Green" rods dried at 110° C. were placed between the knife edges, which were 4 inches apart, of a modulus of rupture machine, and a constant rate of load of 200 lb./min. was applied. Moduli of rupture were obtained from the equation $$\text{modulus of rupture} = \frac{8lw}{\pi d^3}$$

where $l$ = span (in.); $w$ = load (lb.); and $d$ = diameter of rod (in.), and are shown in Table I.

TABLE I

| Green body: | Modulus of rupture (lb./sq. in.) |
|---|---|
| SE | 840 |
| NS-10 | 550 |
| CD-5 | 620 |
| CD-7 | 413 |
| CD-8 | 545 |
| CD-9 | 1130 |
| CD-10 | 1010 |
| CD-15 | 590 |

From these figures it can be seen that calcium borate-containing bodies having a substantially higher modulus than the comparative bodies can be obtained. This enables them to be formed into more intricate shapes than previously known bodies, and the "green" shaped ware can be transported with less risk of damage.

(2) Moduli of rupture of the fired bodies were measured by the technique described above in respect of the green bodies except that the rate of loading was 1000 lb./min. Details of the firing and moduli of the fired bodies are shown in Table II.

TABLE II

| Firing temperature, °C. | Modulus of rupture (lb./sq. in.) | | | | | | |
|---|---|---|---|---|---|---|---|
| | CD-5 | CD-7 | CD-8 | CD-9 | CD-10 | CD-15 | SE |
| 925 | | | | | | 5,350 | |
| 950 | | | | | | 6,700 | 1,700 |
| 1,000 | 3,850 | | | | 5,000 | 6,400 | 1,900 |
| 1,030 | 4,550 | | | | 6,350 | 6,250 | 2,550 |
| 1,060 | 5,500 | | | 7,700 | 6,900 | 4,850 | 3,700 |
| 1,080 | | 6,760 | 6,400 | 7,150 | 7,000 | 4,300 | 4,750 |
| 1,100 | 6,100 | | | | 5,650 | | |
| 1,120 | | 7,600 | 6,900 | 6,450 | | | |
| 1,140 | | 7,980 | 6,850 | | | | |
| 1,150 | 6,700 | | | | 4,700 | | 8,000 |
| 1,200 | | | | | | | 8,800 |

(3) The thermal expansion of the fired bodies was measured in a standard thermal expansion machine. The results on SE showed the well known quartz inversion at 573° C. In contrast, this was absent or much reduced in the calcium borate-containing bodies, thus enabling the biscuit cooling and ghost firing of these bodies to be faster than those of the stone-containing body in view of the absence of stress due to rapid change in expansion at 573° C.

The calcium borate used should preferably have a low content of iron since the presence of iron discolors the product. In the material used in the examples the iron content, expressed as $Fe_2O_3$, was 0.07%.

On glazing some of the fired calcium borate-containing bodies, it was found that the glaze forms a more intimate and hence stronger bond than on corresponding stone-containing bodies.

I claim:

1. In the method of producing ceramic bodies by combining about 30 to 70 parts of clay, about 20 to 50 parts of flint and a flux, forming a green body from the resultant combination and firing said green body, the improvement which comprises employing as said flux about 9 to 10 parts of calcium borate, said parts by weight, thereby increasing the strength of the unfired green body.

References Cited

UNITED STATES PATENTS

| | | | |
|---|---|---|---|
| 1,127,042 | 2/1915 | Locke | 106—46 |
| 2,077,610 | 4/1937 | Bahl | 106—45 |
| 2,159,349 | 5/1939 | Bennett | 106—45 |
| 2,382,137 | 8/1945 | Crowley et al. | 106—46 |
| 3,097,101 | 7/1963 | Lester | 106—46 |
| 1,930,095 | 10/1933 | Hauser | 106—45 |
| 2,871,132 | 1/1959 | Hummel | 106—45 |

HELEN M. McCARTHY, Primary Examiner

W. R. SATTERFIELD, Assistant Examiner

U.S. Cl. X.R.

106—39, 46